United States Patent

Sakaguchi et al.

[11] Patent Number: 4,809,031
[45] Date of Patent: Feb. 28, 1989

[54] PHOTOMETER FOR USE IN A CAMERA

[75] Inventors: Touru Sakaguchi, Itabashi; Akira Takahashi, Kawashi; Akira Ueno, Shinjuku, all of Japan

[73] Assignee: Ricoh Company, Ltd., Tokyo, Japan

[21] Appl. No.: 131,731

[22] Filed: Dec. 11, 1987

[30] Foreign Application Priority Data

Dec. 11, 1986 [JP] Japan .................. 61-293474
Dec. 11, 1986 [JP] Japan .................. 61-189835[U]

[51] Int. Cl.⁴ ............................................. G03B 7/08
[52] U.S. Cl. ............................ 354/429; 354/478
[58] Field of Search ............... 354/414, 429, 430, 431, 354/432, 433, 478

[56] References Cited

U.S. PATENT DOCUMENTS

| | | | |
|---|---|---|---|
| 3,232,192 | 2/1966 | Stimson | 354/432 |
| 3,450,016 | 6/1969 | Yamada | 354/478 |
| 3,529,893 | 9/1970 | Holle et al. | 354/429 |
| 3,741,087 | 6/1973 | Kitai | 354/434 |
| 4,053,908 | 10/1977 | Saito et al. | 354/434 |
| 4,063,257 | 12/1977 | Mashimo et al. | 354/414 |
| 4,682,873 | 7/1987 | Ohmura et al. | 354/478 |
| 4,712,903 | 12/1987 | Schaefer | 354/433 |
| 4,739,360 | 4/1988 | Ohmura et al. | 354/429 |

*Primary Examiner*—Russell E. Adams
*Attorney, Agent, or Firm*—Oblon, Fisher, Spivak, McCelland & Maier

[57] ABSTRACT

A photometer in a camera having a plurality of light receiving portions on an identical substrate for conducting photo-metering for portions each corresponding to a marginal area and a central area of a picture plane in the camera.

4 Claims, 6 Drawing Sheets

PHOTOMETER FOR USE IN A CAMERA

BACKGROUND OF THE INVENTION

1. Field of the Invention

The present invention concerns a photometer for use in a camera and, more specifically, it relates to a photometer for use in a camera that measures the brightness at the portions corresponding to the central area and the marginal area on a picture plane of a camera.

2. Discussion of Background

It is desired in a camera having the function for automatic exposure control that an adequate exposure control can be conducted, for example, to objects in the normal light state, as well as to objects having highlight and shadow portions such as objects in back-light state. This requires exact light metering, that is, exact metering of the brightness of the object. However, the accuracy of the metering varies greatly depending on the way of measuring the light from the respective areas of an object, that is, depending on the arrangement of a pattern having sensitivity on a picture plane of a camera. The metering method can be classified into partial metering, average metering, center weighted metering, etc. depending on the portions to be measured on a picture plane of a camera. In the case of an object in the back-light state described above, it has been considered effective to conduct metering for the marginal area and the central area on the picture plane. Therefore, there has been used a photometer having two photoreceiving elements, that is, a photoreceiving element for metering the marginal area and a photoreceiving element for metering the central area to detect that an object is in the back-light state. However, the photoconductive material of the photoreceiving element is generally made of such semiconductor as cadmium sulfide (CdS), cadmium selenide (CdSe), etc. Therefore, it has been difficult to keep the characteristics of respective photoreceiving elements within a narrow allowable range. Accordingly, a compensating circuit, etc. has been disposed additionally for absorbing such scattering of the characteristics of the photoreceiving elements for use in marginal and central area. This increases the material cost and increases the number of fabrication and adjustment steps, which results in the increase of the production cost.

Referring, for instance, to transistors which are typical semiconductor products, since it is not practical to keep their characteristics within a narrow range as described above, it has been a general practice to allow the scattering of the characteristics and classify them into several groups depending on the degree of scattering upon marketing them. Those goods referred to as pair transistors incidentally having characteristics substantially identical with each other selected on the side of manufactures, are supplied on the market as paired products. Since such pairs are selected by chance, yield of the products is low and the cost is naturally high. The situation is similar in the case of photoreceiving elements and it is apparently disadvantageous in view of the cost to select pairs of photoreceiving elements having substantially identical characteristics in the mass products such as cameras.

Therefore, the advent of photoreceiving elements of uniform characteristics capable of conducting photo-metering for the marginal area and the central area on the picture plane has been required.

In addition to that, to detect the back-light state of an object in the exposure control section, complicated analog or digital calculations are necessary for compensating the output from each of the photoreceiving elements for photo-metering the marginal and central areas, consequently circuits and devices for the calculations are necessary which obstruct the simplification of the structure.

SUMMARY OF THE INVENTION

The present invention has been made in view of the foregoing situations and the purpose thereof is to provide a photometer having a simple structure that can be manufactured at a reduced cost and can easily and surely detect the back-light state of an object.

Another purpose of the present invention is to provide a photometer having a simple structure for use in a camera that can be manufactured at a reduced cost, conduct photo-metering for both the marginal and the central areas of the picture plane at a high sensitivity, particularly, detect the back-light state of the object easily and properly, and compensate the metering error resulted from the brightness difference between the marginal and central areas, and that is almost free from the effect of the fluctuation of power source voltage or temperature change.

The foregoing purpose of the present invention can be attained by a photometer in a camera having a plurality of light receiving portions on an identical substrate for conducting photo-metering for portions each corresponding to a marginal area and a central area of a picture plane in the camera, comprising:

a first light receiving portion comprising a narrow zigzag stripe-like photoconductive material disposed to cover most of a marginal portion of the substrate corresponding to the marginal area of the picture plane, a first electrode in contact with an outer circumference of the first light receiving portion, a second light receiving portion comprising a narrow zigzag stripe-like photoconductive material disposed inside the first light receiving portion and about at a central portion of the substrate corresponding to the central area of the picture plane, a second electrode in contact with an outer circumference of the second light receiving portion and in contact with an inner circumference of the first light receiving portion, and a third electrode in contact with an inner circumference of the second light receiving portion, a back-light signal indicating extent of back-light of an object being outputted from the second electrode when a voltage is applied between the first electrode and the third electrode.

The another purpose of the present invention can be attained by a photometer in a camera having a plurality of light receiving portions on an identical substrate for conducting photo-metering for portions each corresponding to a marginal area and a central area of a picture plane in the camera, comprising:

a first light receiving portion comprising a narrow stripe-like photoconductive material disposed to cover most of a marginal portion of the substrate corresponding to the marginal area of the picture plane, a first electrode in contact with an outer circumference of the first light receiving portion, a second light receiving portion comprising a narrow stripe-like photoconductive material disposed inside the first light receiving portion and about at a central portion of the substrate corresponding to the central area of the picture plane, a second electrode in contact with an outer circumference of the second light receiving portion and in contact with an inner circumference of the first light receiving portion, a third electrode in contact with an inner circumference of the second light receiving portion, a power source for applying a reference voltage between the first and the third electrodes, a back-light detecting means for detecting a back-light degree of an object and producing a back-light signal indicative of the back-light degree on the basis of a magnitude of a voltage between the second and the third electrodes, a brightness difference calculating means for calculating a brightness difference between the marginal portion and the central portion of the substrate on the basis of the back-light signal received from the back-light detecting means, and a compensating signal producing means for producing a compensating signal on the basis of the brightness difference calculated by the brightness difference calculating means, said compensating signal being added to a signal indicative of brightness of the central portion of the substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4 and 5 are views illustrating application examples of the present invention in which FIG. 4 is a circuit diagram illustrating a constitution of one embodiment for a back-light detecting circuit and FIG. 5 is a circuit diagram capable of back-light detection and spot light-metering;

DESCRIPTION OF THE PREFERRED EMBODIMENTS

The present invention will be described specifically by way of its preferred embodiment referring to the accompanying drawings.

Figure 2:
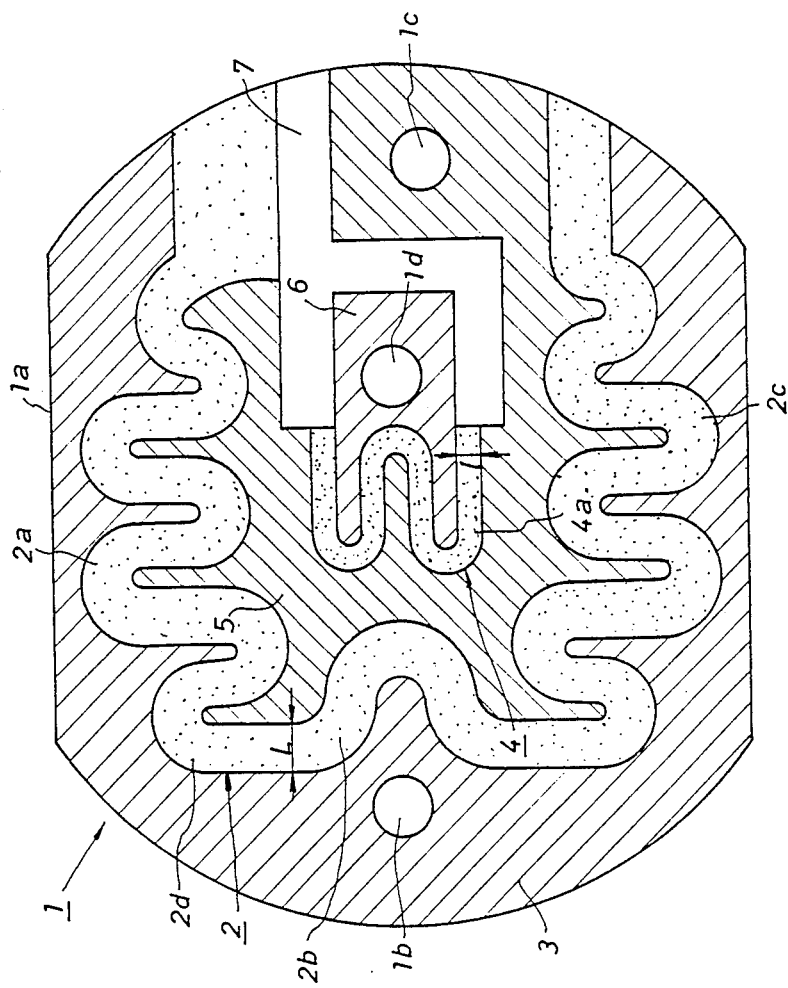
FIG. 2 is an enlarged plan view for the constitution of one embodiment of a photoreceiving element for use in a camera according to the present invention.

FIG. 2 is an enlarged plan view for the constitution of one embodiment of a photoreceiving element in a photometer according to the present invention.

In the figure, are shown a photoreceiving element cell 1, a substrate 1a made of flat ceramic material, apertures 1b–1d perforated in the substrate 1a for inserting lead wires or connection pins, a marginal pattern 2 as the first light receiving portion comprising a narrow strip-like photoconductive material of a width L such as made of CdS (cadmium sulfide) disposed in a zig-zag manner, upper, side and lower portions 2a, 2b and 2c on the substrate 1a corresponding respectively to the upper, side and lower areas of the picture plane, main body 2d for constituting the marginal pattern 2. an electrode 3 as a first electrode in contact with the outer circumference of the marginal pattern 2, a central pattern 4 as a second light receiving portion made of the stripe-like material of width 1, narrower than that of the pattern 2 disposed in a zig-zag manner inside the pattern 2 and about at the center of the substrate 1a, a main body 4a for constituting the central pattern 4, a common electrode 5 as the second electrode in contact with the outer circumference of the central pattern 4 and also in contact with the inner circumference of the marginal pattern 2, a central electrode 6 as the third electrode insulated from the common electrode 5 and in contact with the outer and the inner circumference of the central pattern 4, and an insulation groove 7 of a recessed cross section disposed in the substrate 1a for insulating the central electrode 6 and the common electrode 5 from each other. The central pattern 4 and the marginal pattern 2 are disposed as close as possible. Although not illustrated, lead wires, for example, made of tin-plated copper wires are inserted in the apertures 1b–1d and electrically connected with the electrodes 3, 5 and 6 by means of electro-conductive paints, etc. Accordingly, the lead wires connected with the electrode 3 are referred to as an outer circumference terminal, the lead wires connected with the electrode 5 are referred to as the common terminal and the lead wires connected with the electrode 6 are referred to as the central terminal.

Figure 3:
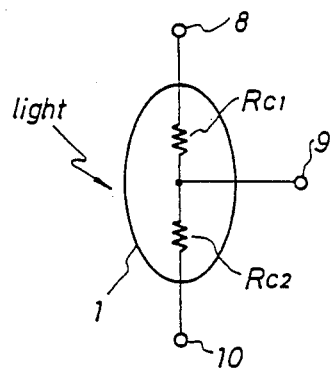
FIG. 3 is a circuit diagram illustrating the embodiment as an equivalent circuit.

FIG. 3 is a circuit diagram illustrating the photoreceiving element shown in FIG. 2 in an equivalent circuit. In the figure, are shown the central terminal 8, the common terminal 9, the outer circumference terminal 10, a spot resistor Rc1 comprising the central pattern 4, and a marginal resistor Rc2 comprising the marginal pattern 2. The arrow shows the direction of light.

Figure 4:
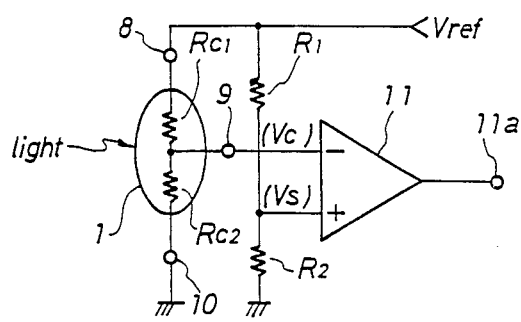

In FIG. 4 and succeeding figures, those identical or equivalent with the members or portions in FIGS. 2 and 3 carry the same reference numerals and the overlapped explanation is omitted.

Figure 5:
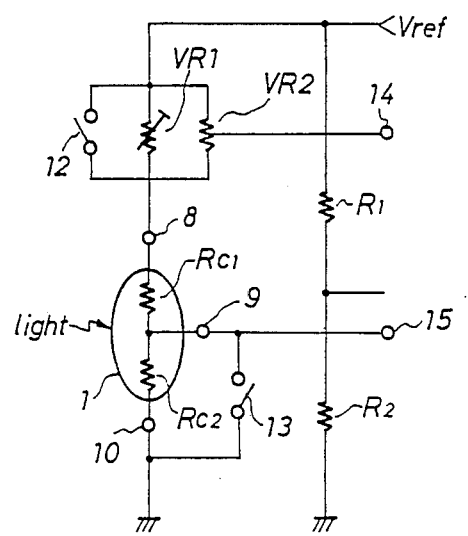

FIGS. 4 and 5 are circuit diagrams illustrating one embodiment of a back-light detecting circuit constituting a portion of the present invention.

In FIG. 4, are shown reference resistors $R_1$ and $R_2$ for generating a reference voltage, back-light voltage $V_c$ as back-light signal outputted from the common terminal 9, said reference voltage $V_s$ as a back-light signal being outputted from the common terminal, a reference power source Vref for supplying a voltage to the cell 1 and the reference resistors $R_1$ and $R_2$, a comparator 11 for detecting the back-light and an output terminal 11a of the comparator 11. The comparator 11 is adapted to output a voltage at negative polarity if $V_s < V_c$, output a voltage at positive polarity if $V_s > V_c$, and output 0 (0V) if $V_s = V_c$. Further, one end of the reference resistor $R_2$ and the outer circumference terminal 10 are connected to the ground, the junction between the reference resistors $R_2$ and $R_1$ is connected with a non-inversion input terminal of the comparator 11, the other end of the reference resistor $R_1$ is connected together with the central terminal 8 to the reference power source Vref and the common terminal 9 is connected with the inversion input terminal of the comparator 11. Further, assuming the spot resistor as $Rc_1$ and the marginal resistor as $Rc_2$ when light is uniformly irradiated on the photoreceiving elements, the reference resistors $R_1$ and $R_2$ are constituted so as to be in a relationship; $R_1 : R_2 = Rc_1 : Rc_2$.

In FIG. 5, are shown a back-light detection switch 12, a spot photo-metering switch 13, a semi-variable resistor $VR_1$ for compensation, a variable resistor $VR_2$ for output control, a spot photo-metering output terminal 14 and a back-light detection power terminal 15. The back-light detection switch 12, the semi-variable resistor $VR_1$ and the variable resistor $VR_2$ are connected at their respective one ends in parallel with the reference power source Vref, while the other ends thereof are connected in parallel with the central terminal 8, the movable contact of the variable resistor $VR_2$ is connected with the spot photo-metering output terminal 14, the common terminal 9 is connected to one end of the back-light detection power terminal 15 and one end of the spot photo-metering switch 13, and the other end of the spot photo-metering switch 13 is grounded together with the outer circumference terminal 10 to the earth.

Figure 6:
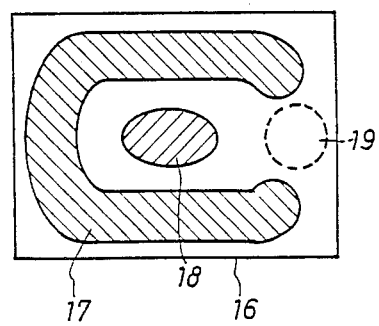
FIG. 6 is an explanatory view illustrating the distribution of the photo-sensitivity of the embodiment shown in FIG. 2 corresponding to the picture plane.

FIG. 6 is a view illustrating the distribution of the photo-sensitivity on the cell 1 shown in FIG. 2.

In the figure, are shown a frame 16, a high sensitivity portion 17 in the marginal pattern 2, a high sensitivity portion 18 in the central pattern 4 and a low sensitivity portion (insensitivity portion) 19 required for arrangement of terminals, etc.

Figure 7:
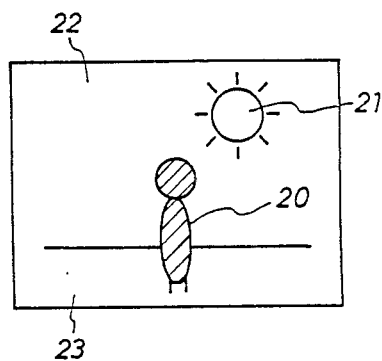
FIGS. 7(a) and (b) are, respectively, explanatory views illustrating the relationship between an object and a light source when the object in the back-light state is photographed in a lateral and a longitudinal compositions.
Figure 7:
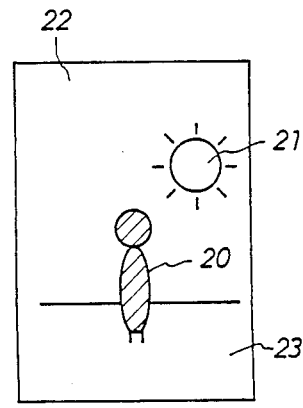

FIGS. 7(a) and (b) are views showing the typical compositions of an object in a back-light photography. FIG. 7(a) shows a lateral composition, while FIG. 7(b) shows a longitudinal composition. In the figure, are shown an object such as a human, a light source 21 such as the sun causing the back-light state, the sky 22 and the ground.

Figure 8:
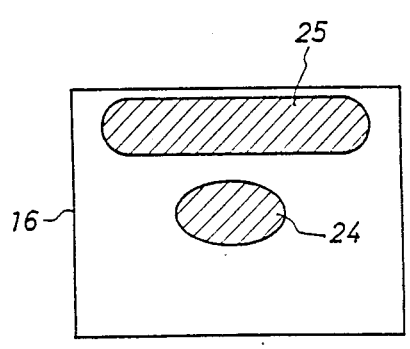
FIGS. 8(a) and (b) are, respectively, views illustrating an area on the picture plane to be measured for back-light detection in the compositions shown in FIGS. 7(a) and (b)
Figure 8:
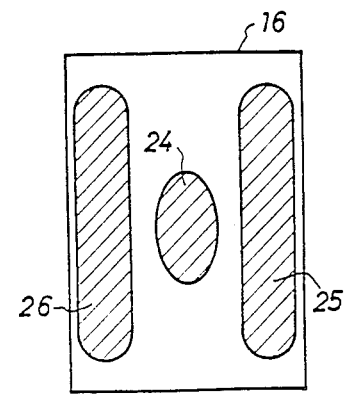

FIGS. 8(a) and (b) are, respectively, views illustrating examples of arrangement of photo-sensitive areas for effectively photo-metering the object and the light source in compositions shown in FIGS. 7(a) and (b). In the figures, are shown an area 24 for enabling photo-metering of the object 20 and areas 25 and 26 for enabling photo-metering of the back-light source 21.

Figure 9:
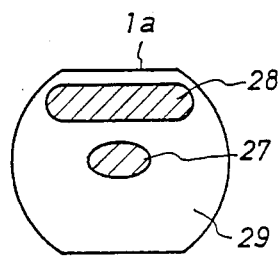
FIGS. 9(a) and (b) are, respectively, views illustrating different arrangements of patterns in the light receiving portion required for the back-light detection.
Figure 9:
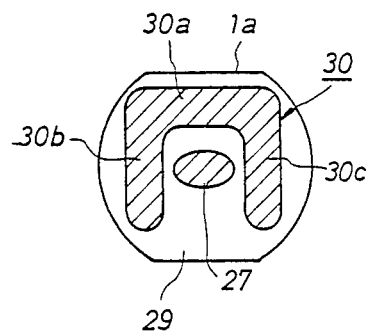

FIGS. 9(a) and (b) are views illustrating examples of patterns for the photoreceiving portion made of photo-conductive material on the substrate 1a which are required for detecting the back-light state. In FIG. 9(a), are shown a central pattern 27, a marginal pattern 28 and a non-sensitive portion 29 of photo-insensitive material. In FIG. 9(b), reference numeral 30 also represents a marginal pattern, in which 30a represents the upper side, and 30b and 30c represent respectively side portions.

Figure 10:
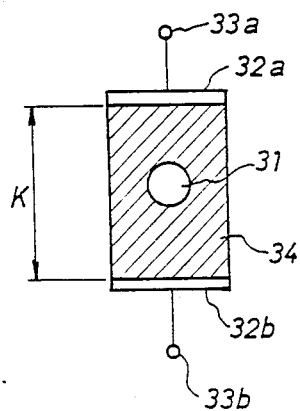
FIGS. 10(a) and (b) are, respectively, schematic views for illustrating a relationship between the shape and the photo-metering function of a main body constituting a light receiving portion.
Figure 10:
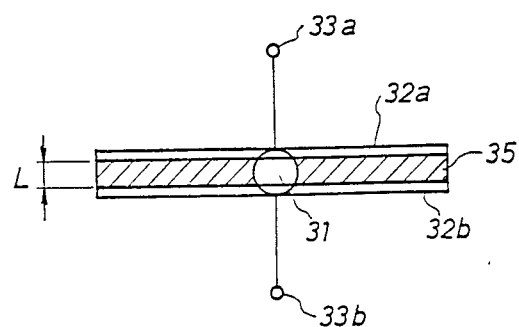

FIGS. 10(a) and (b) illustrate the shape of the main body in the light receiving portion. In FIG. 10(a), are shown a spot light 31 irradiated on the photoreceiving element, electrodes 32a and 32b, terminals 33a and 33b connected respectively to the electrodes 32a and 32b, a wide main body 34 extended longitudinally in the direction of the electrodes 32a, 32b. In FIG. 10(b), reference 35 represents a main body extended laterally along the electrodes 32a and 32b.

Figure 11A:
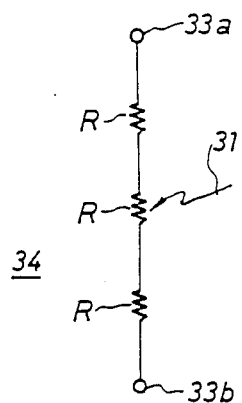
FIGS. 11(a) and (b) are, respectively, circuit diagrams illustrating the equivalent circuit for the patterns shown in FIGS. 10(a) and (b)

FIGS. 11(a) and (b) are equivalent circuit diagrams for the FIGS. 19(a) and (b). Although they should be treated as a distributed constant circuit, the resistance distribution of the main bodies 34 and 35 is shown by three resistors R for the simplicity of the explanation. Reference 31 represents the spot light.

Figure 1:
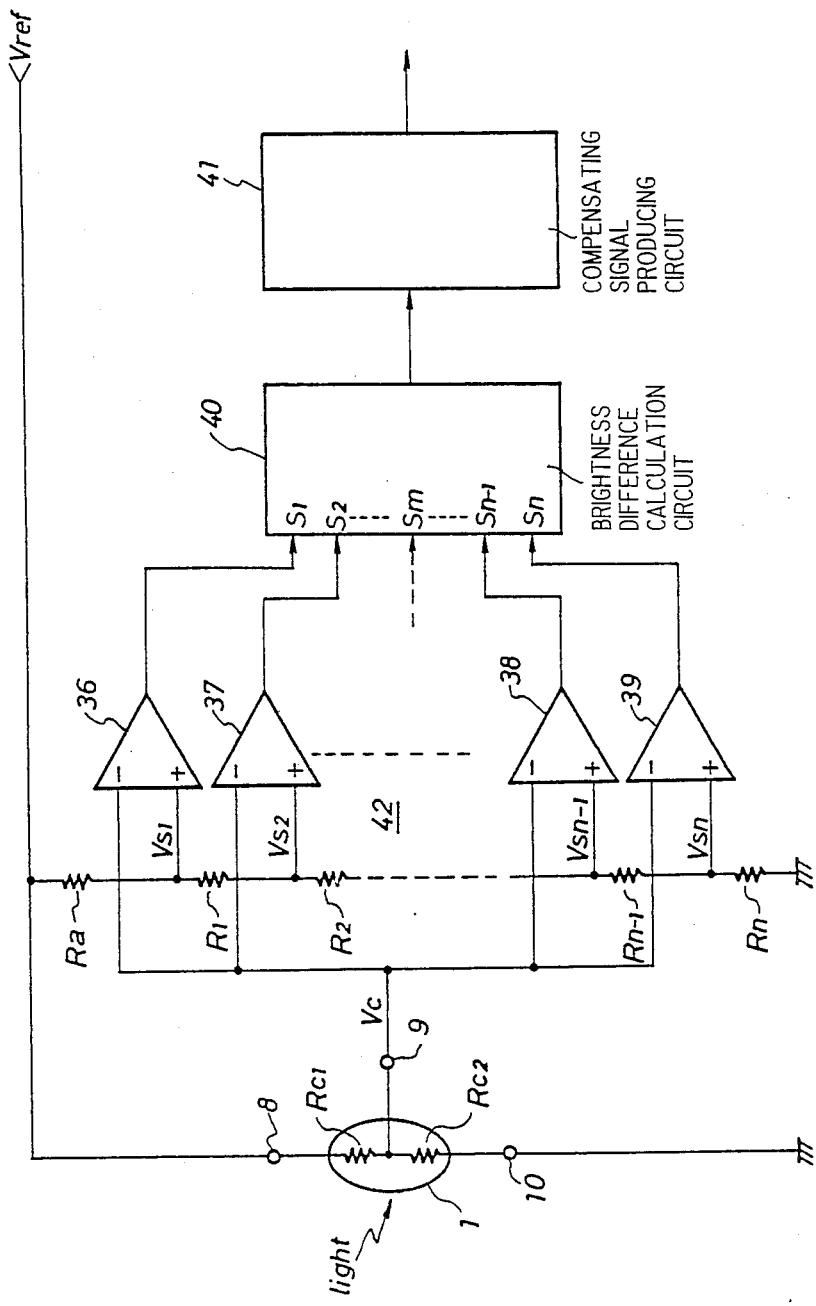
FIG. 1 is a circuit block diagram illustrating one embodiment of a circuit structure according to the present invention.

FIG. 1 is a circuit block diagram showing the constitution of one embodiment for the photometer of a camera according to the present invention.

In the figure, are shown 1st-$n_{th}$ comparators 36-39, a brightness difference calculation circuit, a compensating signal producing circuit 41, 1st-$n_{th}$ reference resistors $R_1$-$R_n$ substantially of identical values connected in series, a control resistor Ra, 1st-$n_{th}$ reference voltage $Vs_1$-$Vs_n$ n divided by the reference resistors $R_1$-$R_n$ and the control resistor Ra. The central terminal 8 is connected together with one end of the control resistor Ra to the power source Vref, the other end of the control resistor Ra is connected to one end of the referene resistor $R_1$, the junction between them is connected to the non-inversion input terminal of the first comparator 36 and, in the same manner, the junction point between the $(n-1)_{th}$ reference resistor $R_{n-1}$ and the $n_{th}$ reference resistor Rn is connected to the non-inversion input terminal of the $n_{th}$ comparator 39, the inversion input terminals of the 1st-$n_{th}$ comparators 36-39 are connected together to the common terminal 9 and the other end of the $n_{th}$ reference resistor $R_n$ of the outer circumference terminal 10 is grounded to the earth. The respective outputs of the comparators 36-39 are connected to the 1st-$n_{th}$ input terminals S1-Sn of the brightness difference calculation circuit respectively and the output terminal of the brightness difference calculation circuit 40 is connected with the input terminal of the compensating signal producing circuit 41. Although not illustrated, the output of the compensating signal producing circuit is supplied to an addition circuit together with the output from the terminal 14 of the photo-metering circuit, for example, shown in FIG. 5, then inputted to an exposure calculation circuit and used as the information for the shutter control, diaphragm control, strobo control and display control, etc. Further the comparators 36-39 and the reference resistor $R_1$-$R_n$, as well as the control resistor Ra constitute the back-light detecting circuit 42. The comparators 36-39 are adapted to recognize the back-light state when the relationship between the reference voltages $Vs_1$-$Vs_n$ applied to the respective non-inversion input terminals and the back-light voltage $V_c$ applied to the inversion input terminal is: $Vs_1$-$Vs_n > Vc$ to invert the respective outputs from the low (L) level to the high (H) level, and if $Vs_1$-$Vs_n \leq Vc$, they recognize the forward-light state to invert the respective outputs to the L level.

Figure 12:
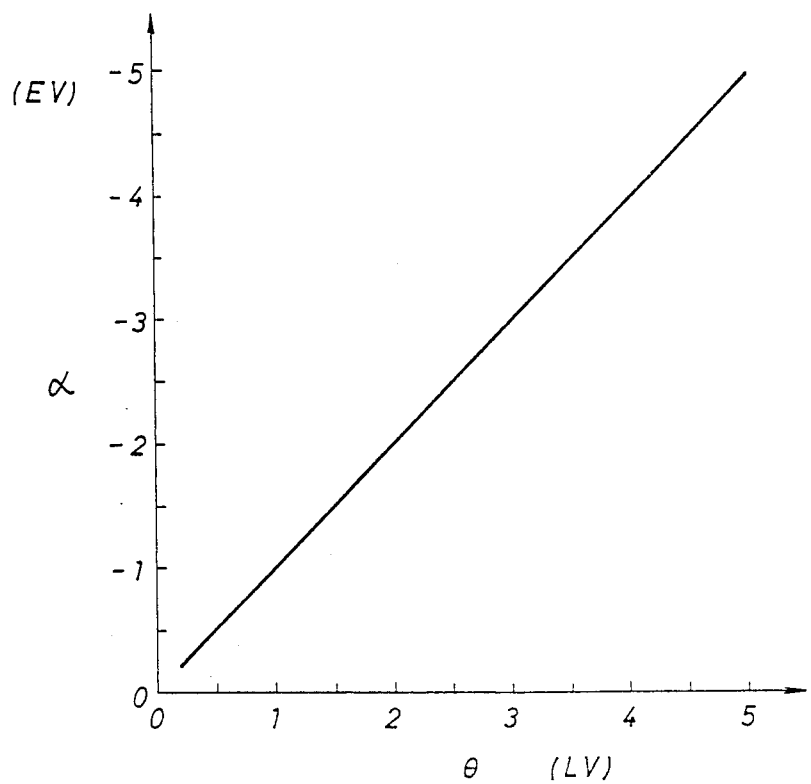
FIG. 12 is a graph illustrating the amount of compensation to the error in photo-metering.

FIG. 12 is a graph determined experimentally, in which $\theta$ indicated on the abscissa represents the difference in the amount of light between the marginal pattern 2 and the central pattern 4, that is, the brightness difference as described above, while $\alpha$ indicated on the ordinate represents a compensation amount to be compensated for the error of photo-metering in the central pattern 4 relative to the brightness difference $\theta$. That is, it can be said that the compensation amount $\alpha$ is about in a linear proportion to the brightness difference $\theta$. (EV) AND (LV) respectively represent units for the compensation amount $\alpha$ and the brightness reference $\theta$. Accordingly, assuming the photo value at the central pattern 4 as 8 (LV) while the brightness difference $\theta$ is 2 (LV), the compensation amount $\alpha$ is $-2$ (EV) and the true value is $8-2=6$ (EV).

While details of the operation are described in the latter explanation, the compensating signal producing circuit 41 in FIG. 1 is constituted by a microcomputer or the like and data corresponding to FIG. 12 are stored in ROM, etc. Further, the brightness difference calculation circuit 40 is adapted to receive the output from the back-like detecting circuit 42 at the input terminals $S_1-S_n$, determines the ratio of the resistance of the spot resistor $Rc_1$ to that of the marginal resistor $Rc_2$ when the back-light is detected and determines the brightness difference $\theta$ as described above based on the ratio and outputs the determined difference to the circuit 41.

Further, although the ratio of the control resistor Ra to the reference resistors $R_1-R_n$ may be set variously in this embodiment the control resistor Ra is set so as to satisfy : $Vs \geq Vs_1$ if the object is in a forward light state, that is, any of the comparators 36-39 is at an OFF (L level) to simplify the explanation. That is, $Rc_1$ and $Rc_2$ are set as $Rc_1:Rc_2=Ra:RO$ $(R_0=R_1+R_2+ \ldots +R_{n-1}+R_n)$ if the entire picture plane is in a uniform state.

Description will be made to the operation of this embodiment.

Prior to the explanation of the operation of the back-light detection and the compensating signal calculation, explanation is made for the shape of the main bodies 2d and 4a constituting the marginal pattern 2 and the central pattern 4 shown in FIG. 2, referring to FIGS. 10(a) and (b) and FIGS. 11(a) and (b).

In photoconductive material such as CdS, the resistance value is generally reduced upon being applied with light. As shown in FIG. 10(a), the main body 34 having a much longer distance K between electrodes than the diameter of the spot light 31 irradiated on the photoreceiving element is considered as a serial circuit of the resistors R as shown in FIG. 11(a). Then, the spot light 31 merely reduces the resistance value of one resistor R. For simplifying the description, assuming that the resistance value of the resistor R irradiated with the spot light 31 is reduced to 0, the resistance value between the terminals 33a and 33b becomes 2R.

Figure 11B:
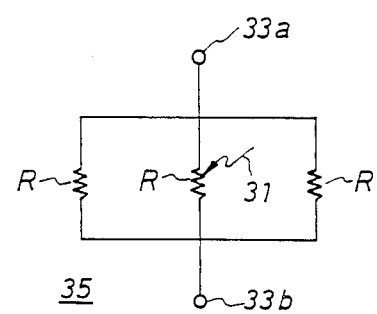

On the other hand as shown in FIG. 10(b), in the case of the main body 35 having the distance L between electrodes somewhat shorter than the diameter of the spot light 31, when the resistance value of one of the resistors R connected in parallel as shown in FIG. 11(b) is reduced to 0 by the spot light 31, the synthetic resistance between the terminals 33a and 33b is also reduced to 0. That is, the arrangement shown in FIG. 10(b) causes a great change in the resistance value, compared with the synthetic resistor 2R in the case of FIG. 11(a), if a minute spot light 31 is irradiated.

Further in this embodiment, since the thus formed main bodies 2d, 4a are constituted in a zig-zag manner (FIG. 2), the chance that the spot light 31 hits the pattern bodies 2d, 4a is improved. Accordingly, since photo-sensitivity can be increased, and the accuracy of the back-light detection can be improved.

Then, explanation will be made to the area (portion) where the thus formed pattern bodies 2d, 4a are disposed.

For example, in the case of the lateral composition as shown in FIG. 7(a), when the brightness of the object 20 is lower (or it is lower by a predetermined level), the back-light state can be detected. The portion required for the photo-metering on the picture plane therefor must comprise at least the area 24 for photo-metering the object 20 and the area 25 for photo-metering the light source 21 as shown in FIG. 8(a). The composition is not restricted only to the lateral composition but it is also applicable to the longitudinal composition as shown in FIG. 7(b). Further, in the case of the longitudinal composition, the bottom of the camera may possibly situated to the right and left in FIG. 7(b) by means of the habits of a camera operator, etc. Accordingly, for coping therewith, areas 25 and 26 for photo-metering the light source 21 are required as shown in FIG. 8(b). It is further desirable that the photo-metering is also possible in the upper and the lower sides in the FIG. 8(b). However, since the lower side in the figure corresponds to the ground 23, it can be out of the photoconductive portion. In the cell 1 of the embodiment shown in FIG. 2, the areas 25 and 26 and the upper side as constitute the marginal pattern 2, while the area 24 for photo-metering the object 20 at the central area constitutes the central pattern 4.

For attaining the photo-metering for the areas 24 and 25 as shown in FIG. 8(a), the main body may be disposed on the substrate 1a as shown in FIG. 9(a). Further, since such a case is possible where the light source 21 is present on either side portion in FIG. 8(a), the main body may be disposed as shown in FIG. 9(b). In FIG. 9(b), the non-sensitive portion 29 corresponds to the ground 23 in FIG. 7(a). Although it is desirable for the marginal pattern 2 to be disposed to cover the entire portion of the marginal area, it is actually difficult to eliminate the non-sensitive portion 29 since a space for disposing electrode, terminal etc. on the substrate 1a is required. Accordingly, the marginal pattern 30 shown in FIG. 9(b) is the arrangement nearest to the ideal constitution for the lateral composition shown in FIG. 7(a), while the marginal pattern 2 shown in FIG. 2 is the arrangement nearest to the ideal constitution for the longitudinal composition shown in FIG. 7(b). In the cell 1 of this embodiment shown in FIG. 2, since the central pattern 4 and the marginal pattern 2 are disposed as close as possible, the low sensitivity portion 19 with a low sensitivity as shown in FIG. 6 is limited only to a small area for the space for disposing the common terminal 9.

The operation for detecting the back-light state will be explained referring to FIG. 4.

When the optical rays for photography are not irradiated to the cell 1, the voltage at the output terminal 11a is 0 V since Vc=Vs. When the optical rays for photography are entered from the direction of the arrow and the object is put to a forward light state, since the brightness at the central pattern 4 corresponding to the object becomes higher than that in the marginal pattern 2, the resistance value of the spot resistor $Rc_1$ is decreased and, accordingly, Vc goes higher as: $Vs<Vc$, and the output from the output terminal 11a is at negative voltage, for example −3 V.

On the other hand, in the case where the object is in a back-light state, the brightness at the marginal pattern 2 is higher than that at the central pattern 4 accordingly, the resistance value of the marginal resistor $R_2$ is decreased as : $V_s > V_c$, and the voltage at the output terminal 11a is inverted to a positive polarity, for example, +3 V. Accordingly, it can be judged that the brightness difference between the central area and the marginal area is within a predetermined range if the output voltage is 0 V, that the object is in the back-light state if it is at the positive polarity and that the object is in the forward light state if it is at the negative polarity. In this way, since it is constituted such that the change in the ratio of the resistance of the spot resistor $Rc_1$ to that of the marginal resistor $Rc_2$ is compared with the ratio of resistance of the reference resistor $R_1$ to that of the resistor $R_2$, the spot resistor $Rc_1$ and the marginal resistor $Rc_2$ disposed on the identical substrate 1a undergo substantially the same change when the cell 1 undergoes temperature changes, etc. and, accordingly, the change in the resistance ratio ($Rc_1/Rc_2$) is extremely small.

Further, since the cell 1 and the reference resistors $R_1$ and $R_2$ are connected to the common reference voltage Vref, the reference voltage $V_s$ and $V_c$ changes similarly, therefore, the effect of the change in the reference power source Vref is small. Accordingly, the back-light detection can be made highly stably and at a good accuracy.

In FIG. 5, when the back-light detection switch 12 is closed and the spot photo-metering switch 13 is opened, the connection relationship is made identical with that of the cell 1 shown in FIG. 4.

On the other hand, when the spot photo-metering switch 13 is closed and the back-light detection switch 12 is opened, since the marginal resistance $Rc_2$ of the cell 1 is short-circuitted, only the spot resistor $Rc_1$ can operate to enable the photo-metering for the object (spot). That is, by controlling the semi-variable resistor $VR_1$ and the variable resistor $VR_2$, the detection of the back-light and the photo-metering for the object can be made together with no increase in the cost. Since the photo-metering circuit for the object can be used in common with the back-light detecting circuit shown in FIG. 4, by connecting, for example, an A/D converter to the terminal 14, the result of the photo-metering can be read by a microcomputer.

Explanation will be made to the operation of the compensating signal producing circuit 41 in FIG. 1, which constitutes the main part of the present invention. Assuming the state of the object changes from the forward light state to backward-light state, the relation $Vc < Vs_1$ is attained and the output from the first comparator 36 is turned to H level at first (the state is hereinafter referred to as "ON"). Then, when the extent of the back-light is further increased, that is, the brightness on the marginal pattern 2 is increased and, thus, the resistance value of the marginal resistor $Rc_2$ is decreased, the second comparator 37 is turned ON next. In the same manner, as the extent of the back-light is increased, that is, as the brightness difference is increased, the comparators are successively turned ON from above to below. Then, considering the $m_{th}$ comparator (not illustrated) is turned ON ($1 \leq m \leq n$).

Assuming as:

$$Vc < Vsm \qquad (1)$$

$$R_0 = R_1 + R_2 + \ldots R_{m-1} + R_m + \ldots + R_{n-1} + R_n \qquad (2)$$

$$Rs = R_m + R_{m+1} + \ldots + R_{n-1} + R_n \qquad (3)$$

The following equation can be obtained based on the equations (2) and (3):

$$R_0 = (R_1 + R_2 + \ldots + R_{m-1}) + Rs \qquad (4)$$

$m_{th}$ reference voltage Vsm is represented as:

$$Vsm = \frac{Rs}{Ra + R_0} \cdot V\text{ref} \qquad (5)$$

$$Vc = \frac{Rv_2}{Rc_1 + Rc_2} \cdot V\text{ref} \qquad (6)$$

The equations (5) and (6) are substituted in the equation (1) as :

$$\frac{Rc_2}{Rc_1 + Rc_2} < \frac{Rs}{Ra + R_0} \qquad (7)$$

The equation (7) is modified as :

$$\frac{Rc_1}{Rc_2} > \frac{Ra + R_0 - Rs}{Rs} \qquad (8)$$

The equation (4) is substituted in the equation (8) as :

$$\therefore \frac{Rc_1}{Rc_2} > \frac{Ra + (R_1 + R_2 + \ldots + R_{m-1})}{Rs} \qquad (9)$$

Since the relationship between the ratio of the spot resistor $Rc_1$ to the marginal resistor $Rc_2$ and the amount of optical rays (brightness) irradiated to them is already determined and substantially in a linear relationship, assuming the proportional constant as k, the brightness difference $\theta$ can be determined by the following equation:

$$\theta = k \frac{Rc_1}{Rc_2} \qquad (10)$$

The equation (10) is substituted in the equation (9)

$$\frac{\theta}{k} > \frac{Ra + (R_1 + R_2 + \ldots + R_{m-1})}{Rs} \qquad (11)$$

In this way, the intensity of the back-light, that is, the brightness difference $\theta$ is calculated based on the known resistance values and outputted from the brightness difference calculation circuit 40. The compensating signal producing circuit 41 receives the data of the brightness difference $\theta$ and retrieves the compensation amount $\alpha$ corresponding to the brightness difference $\theta$ from the graph in FIG. 12 and supplies an addition circuit (not illustrated) with the compensation amount $\alpha$ to be added to the output of the central portion.

As described above, in the circuit, for example, shown in FIG. 5, the output transmitted from the terminal 14 and the output corresponding to the compensation amount $\alpha$ transmitted from the circuit 41 when the back-light detection switch 12 is opened and the spot photo-metering switch 13 is closed, are added together to obtain true data representing brightness of the object. The true data outputted from the addition circuit are processed in the exposure calculation circuit (not illustrated) based on the exposure factors, for example, film speed data and the diaphragm data and then converted into shutter speed data.

As described above, according to this embodiment, since the marginal pattern 2 and the central pattern 4 are disposed together on the identical substrate 1a not only the size of the cell 1 can be descreased but also the occurence of errors due to the scattering in the characteristics of the photoconductor (CdS) can be suppressed. Further, as shown in FIG. 4, since the back-light detection is conducted directly based on the ratio of resistance of the spot resistor $Rc_1$ to that of the marginal resistor $Rc_2$, the constitution can be simplified as requiring no complicate calculation circuits at all and the cost can be reduced so much.

Further, since the marginal pattern 2 is disposed to the upper side 2a, side 2b and the lower side 2c, that is, over the most portion of the marginal part in the substrate corresponding to the picture plane it can provide a merit that all of light sources causing the back-light can be detected in view of practical use, particularly, in the longitudinal composition, and the effect of the insensitive portion required for arrangement for the terminals, etc. can be avoided as much as possible by corresponding the insensitive portion to the ground.

Further, since the cell 1, the compensation resistor Ra, reference resistor $R_1$-$R_n$ are connected to the identical reference power source Vref also in FIG. 1 like in FIGS. 4 and 5, no error is resulted due to the change in Vref.

Further, since a diaphragm or the like is not disposed to the optical system for guiding light to the cell 1, the light to the cell 1 is not reduced.

The present invention is not restricted only to the example as described above but can be made in various other embodiments within the scope not departing the gist thereof.

For instance, if the space for containing the cell 1 in the camera permits, the substrate 1a may be formed larger than that shown in FIG. 1 and the apertures 1b and 1c may be perforated outside and the light receiving portion may be disposed in continuous form also at the right side in the figure so that the marginal pattern 2 is disposed substantially over the entire circumference of the marginal area of the substrate.

Further, the back-light detection circuit may use a diode instead of the comparator. In this case, the circuit can further be simplified.

Further, the comparator 11 may be constituted to have two states of the logic levels comprising H level and L level for the output instead of three states, that is, 0 output, positive and negative polarity. In this case, the state Vs=Vc is included to either one of Vs<Vc or Vs>Vc.

Further, the material of the photoconductor is not restricted only to the cadmium sulfide (CdS) but cadmium selenide (CdSe), lead sulfide (PbS), lead selenide (PbSe), etc. may be used depending on the application uses.

Further, in the cell 1 shown in FIG. 1, the outer circumference terminal 10 may not be grounded to the earth and, instead, the central terminal 8 may be grounded to the earth if the relationship ; Rc1:Rc2=R1:R2 can be maintained in the circuit shown in FIG. 4 and the relationship ; Rc1:Rc2=Ra:Ro can be maintained in the circuit shown in FIG. 1.

Further in FIG. 1, the back-light detecting circuit may be constituted with an A/D converter. In this case, the comparators 36–39 may be omitted and only one resist or may be used for the reference resistors R1-Rn as well.

Further, if the brightness difference calculation circuit 40 is constituted to output an analog signal, the compensating signal producing circuit 41 may be constituted with a simple analog circuit such as an operational amplifier.

Furthermore, the circuit for photo-metering the central area of the picture plane can be obtained by adding the circuit shown in FIG. 5 to the circuit shown in FIG. 1. In this case, the back-light detection switch 12 and the spot photo-metering switch 13 may be operated ON-OFF alternately either manually or automatically.

Further, the reference resistors $R_1$-$R_n$ shown in FIG. 1 may not always be divided equally depending on the application uses, for example, in the case of compensating only a predetermined narrow range of the voltage $V_c$, or in the case of compensating the light sensitivity characteristics of the light receiving portion of the cell 1 which is not linear.

As has been described above the present invention can provide a photometer for use in a camera capable of photo-metering both of the marginal and central areas of the picture plane at a high sensitivity and, particularly, capable of easily and properly detecting the back-light state of an object. Further, it can also provide a photometer capable of compensating at a high accuracy the metering error resulted from the brightness difference between the marginal and central areas of the picture plane without reducing the amount of incident light to the photoreceiving element, with no substantial effect of the change in the power source voltage or change in the temperature, by the use of the above-specified photoreceiving element.

What is claimed as new and desired to be secured by Letters Patent of the United States is:

1. A photometer in a camera having a plurality of light receiving portions on an identical substrate for conducting photo-metering for portions each corresponding to a marginal area and a central area of a picture plane in the camera, comprising:

a first light receiving portion comprising a narrow zigzag stripe-like photoconductive material disposed to cover most of a marginal portion of the substrate corresponding to the marginal area of the picture plane;

a first electrode in contact with an outer circumference of the first light receiving portion;

a second light receiving portion comprising a narrow zigzag stripe-like photoconductive material about as a central portion of the substrate corresponding to the central area of the picture plane;

a second electrode in contact with an outer circumference of the second light receiving portion and in contact with an inner circumference of the first light receiving portion;

a third electrode in contact with an inner circumference of the second light receiving portion; and switching means for making a short-circuit between the second and first electrodes when a voltage is applied between the first and third electrodes, wherein a signal indicative of brightness of an object is produced from the third electrode if the short-circuit is made by the switching means, and a back-light signal indicative of extent of back-light of the object is produced from the second electrode if the short-circuit is not made by the switching means.

2. The photometer of claim 1, wherein the photoconductive material is cadmium sulfide (CdS).

3. The photometer of claim 1 or 2, wherein the substrate is made of ceramic material.

4. A photometer in a camera having a plurality of light receiving portions on an identical substrate for conducting photo-metering for portions each corresponding to a marginal area and a central area of a picture plane in the camera, comprising:
- a first light receiving portion comprising a narrow stripe-like photoconductive material disposed to cover most of a marginal portion of the substrate corresponding to the marginal area of the picture plane;
- a first electrode in contact with an outer circumference of the first light receiving portion;
- a second light receiving portion comprising a narrow stripe-like receiving portion and about at a central portion of the substrate corresponding to the central area of the picture plane;
- a second electrode in contact with an outer circumference of the second light receiving portion and in contact with an inner circumference of the first light receiving portion;
- a third electrode in contact with an inner circumference of the second light receiving portion;
- a power source for applying a reference voltage between the first and third electrodes;
- switching means for making a short-circuit between the second and first electrodes, wherein a signal indicative of brightness of an object is produced from the third electrode if the short-circuit is made by the switching means, and a back-light signal indicative of extent of back-light of the object is produced from the second electrode if the short-circuit is not made by the switching means;
- a brightness difference calculating means for calculating a brightness difference between the marginal portion and the central portion of the substrate on the basis of the back-light signal produced from the second electrode; and
- a compensating signal producing means for producing a compensating signal on the basis of the brightness difference calculated by the brightness difference calculating means, said compensating signal being added to the signal indicative of brightness of the object produced from the third electrode.

* * * * *